US007257903B2

(12) United States Patent
Lee (10) Patent No.: US 7,257,903 B2
(45) Date of Patent: Aug. 21, 2007

(54) LEVELING ROD WITH STENCIL (75) Inventor: Shwe Seen Lee, Arcadia, CA (US)

(73) Assignee: City of Los Angeles, Los Angeles, CA (US)

( * ) Notice: Subject to any disclaimer, the term of this patent is extended or adjusted under 35 U.S.C. 154(b) by 0 days.

(21) Appl. No.: 11/158,668

(22) Filed: Jun. 21, 2005

(65) Prior Publication Data

US 2006/0283030 A1    Dec. 21, 2006

(51) Int. Cl.
G01C 15/06    (2006.01)
(52) U.S. Cl. .............................. 33/293; 33/42; 33/296
(58) Field of Classification Search .................. 33/293, 33/294, 295, 296, 809, 810, 811, 812, 521, 33/42, 41.1, 41.6
See application file for complete search history.

(56) References Cited

U.S. PATENT DOCUMENTS

| 47,824 | A | * | 5/1865 | Horton ........................ 33/42 |
| 181,384 | A | * | 8/1876 | Whitehouse ................ 33/296 |
| 637,501 | A | * | 11/1899 | Classon ...................... 33/294 |
| 970,641 | A | * | 9/1910 | O'Neil .................... 33/27.031 |
| 1,165,820 | A | | 12/1915 | Watson |
| 2,450,769 | A | * | 10/1948 | Rothblum ..................... 33/42 |
| 2,562,335 | A | * | 7/1951 | Rundquist .................. 33/810 |
| 2,694,262 | A | * | 11/1954 | Daniel ..................... 33/501.11 |
| 2,713,722 | A | | 7/1955 | Henderson |
| 2,729,895 | A | * | 1/1956 | Backstrom ................. 33/197 |
| 2,818,653 | A | | 1/1958 | Henderson |
| 3,380,164 | A | * | 4/1968 | Norbedo ........................ 33/42 |
| 3,805,390 | A | * | 4/1974 | Craig ....................... 33/27.03 |

(Continued)

FOREIGN PATENT DOCUMENTS

JP    360079215    10/1983

OTHER PUBLICATIONS

Ben Meadows Company, surveying equipment basics, web-site print out, copyright 2003, 2 pages, document No. 1360, Lab Safety Supply, Inc., web-site at.

(Continued)

Primary Examiner—G. Bradley Bennett
Assistant Examiner—Travis Reis
(74) Attorney, Agent, or Firm—Greenberg Traurig, LLP (57) ABSTRACT

A leveling rod and a method of surveying utilizing the disclosed leveling rod are disclosed. The leveling rod comprises an elongated shaft and at least one tape with measurement graduations affixed longitudinally to the elongated shaft. The leveling rod also comprises an elongated side member slidably coupled with the elongated shaft, the elongated side member being extendable downwards. A stencil and an indicator are also included in the leveling rod. The stencil is attached to the bottom end of the elongated side member and is used to mark a surface. The indicator is attachable to the elongated side member and includes a pointer that points to the measurement graduations on the at least one tape. The indicator can slide longitudinally along the elongated side member until a predetermined position of the indicator is reached. The leveling rod further comprises a two threaded fasteners. The first threaded fastener fixes the indicator to the elongated side member and slides together with the indicator before the indicator is fastened to the elongated side member. The second threaded fastener allows to fix the elongated side member to the elongated shaft thus preventing the elongated side member from sliding off the elongated shaft.

15 Claims, 7 Drawing Sheets

U.S. PATENT DOCUMENTS

| | | | |
|---|---|---|---|
| 3,885,315 A | * | 5/1975 | Polselli et al. ............... 33/42 |
| 4,202,108 A | * | 5/1980 | Adams et al. ............... 33/379 |
| 4,345,382 A | | 8/1982 | Warren |
| 5,189,484 A | | 2/1993 | Koschmann et al. |
| 5,197,195 A | * | 3/1993 | Aikens ............... 30/293 |
| 5,799,403 A | | 9/1998 | Schrum |
| 6,209,210 B1 | | 4/2001 | Stout |
| 6,508,006 B1 | | 1/2003 | Black |
| 6,584,697 B1 | | 7/2003 | Guoan et al. |
| 6,657,734 B1 | | 12/2003 | Monz et al. |
| 6,662,458 B1 | | 12/2003 | Antonelli |
| 6,760,974 B1 | | 7/2004 | Jorgenson |

OTHER PUBLICATIONS

Integrated Publishing, leveling rods, web-site prints, May 27, 2005, 7 pages, web-site at.

Integrated Publishing, chaining pin, web-site prints, May 27, 2005, 3 pages, web-site at.

Glossary of surveying terms, web-site prints, May 27, 2005, 9 pages, web-site at.

* cited by examiner

LEVELING ROD WITH STENCIL

BACKGROUND OF THE DISCLOSURE

1. Field of the Disclosure

The present disclosure relates to surveying equipment. In particular, it relates to leveling rods used in leveling and setting grades.

2. General Background

Flowlines along the side of the streets ensure that water does not pond or pool on a city's streets by allowing the water to flow down to the storm drain system. Thus, the grading on the flowline must be accurately established in order to facilitate the correct flowing of the water. Generally, flowline grades are determined using surveying equipment such as a leveling rod and a level instrument.

Typically, once the proper grade has been determined, markings are painted on the curb at a predetermined height above the unpaved street ground. After the marks have been made, paving crews pave the street up to the level of the delta painted on the curb.

Thus, in order to determine the flowline, usually three people are required: an instrument man, and two rod men. Meaning that, since the rod must be held stationary during the operation, it is customary to employ two men at the rod, one supporting the rod and the other to record the marking delta on the curb.

SUMMARY

The leveling rod disclosed herein includes a marking template that extends outwardly from the rod permitting the painting of the marking by the rodman holding the rod. Thus, the person needed to hold the marking template is no longer needed, and flowline grading is possible with only two men.

In one aspect, the leveling rod comprises an elongated shaft with at least one tape with measurement graduations affixed longitudinally to the elongated shaft, an elongated side member slidably coupled with the elongated shaft and being extendable downwards, a stencil attached to the bottom end of the elongated side member, wherein the stencil is used to mark a surface. The leveling rod can also comprise an indicator attachable to the elongated side member, wherein the indicator includes a pointer that points to the measurement graduations on the at least one tape, wherein the indicator can slide longitudinally along the elongated side member until a predetermined position of the indicator is reached. The indicator can be attached to the elongated side member permitting indicator slides in conjunction with the elongated side member in relation with the main rod.

The rod can also include two fasteners. The first threaded fastener fixes the indicator to the elongated side member, wherein the first threaded fastener can slide together with the indicator before the indicator is fastened to the elongated side member. The second threaded fastener allows fixing the elongated side member to the elongated shaft thus preventing the elongated side member from sliding off the elongated shaft. The stencil can have a triangular shape and can be used to make a marking on the vertical face of a curb. The stencil can also have a rectangular shape or a circular shape. Further, the shaft can have a rectangular cross-section or a circular cross-section.

In another aspect, if the leveling rod is utilized with a level instrument the pointer in the indicator is calibrated and fixed to point to a measurement equal to the height of the level instrument measured from the flowline on a street. Thus, a predetermined position of the indicator can be the height of the level instrument.

In another aspect, the leveling rod can further comprise a groove longitudinally disposed in the shaft wherein the elongated side member can be slid. Moreover, a second groove longitudinally can be disposed in the shaft wherein the second threaded fastener can move up and down, wherein the second threaded fastener fastens the elongated side member to the elongated shaft thus preventing the elongated side member from sliding off the elongated shaft. Finally, the leveling rod can further comprise a resting foot attached to the bottom of the leveling rod in order to permit the leveling rod to stand without lateral support.

In one aspect, there is an apparatus to survey a flowline on a street. The apparatus comprises a main rod having measurement graduations on a longitudinal side and a stencil attached to the bottom end of the extendable side rod, wherein the stencil is used to make a distinctive mark a vertical surface of a curb. The apparatus also includes an extendable side rod slidably coupled with the rod, wherein the longitudinal axis of the extendable side rod is parallel to the longitudinal axis of the main rod, wherein the extendable side rod slides passing the bottom end of the main rod. Moreover, the apparatus can have a pointer fixable to the extendable side rod, wherein the pointer points to the measurement graduations of the main rod, wherein the pointer is mounted on a bracket that slides longitudinally along the extendable side rod until a predetermined position of the pointer is reached. In addition, the apparatus can include fastening assemblies. A first bolt and knob assembly fixes the pointer to the extendable side rod, wherein the first bolt and knob assembly can slide together with the pointer before the pointer is fixed to the extendable side rod. A second bolt and knob assembly allows fixing the extendable side rod to the main rod thus preventing the extendable side rod from sliding off the main rod.

In yet another method, there is a method of surveying a flowline utilizing a leveling rod with a stencil. A leveling rod having a graduated shaft and an elongated side member is provided, wherein the elongated side member is slidably coupled with the graduated shaft and has a stencil attached to the bottom end. A level instrument is placed on a curb, the level instrument being calibrated such that the line of sight of the level instrument is parallel to a desired flowline. A first marking is made on the side of a curb, the first marking being a point in the flowline. An indicator is attached to the elongated side member at an elevation relative to the bottom end of the elongated side member, the height of the elevation being equal to the height of the level instrument in relation to the first marking. The leveling rod is placed at a predetermined distance from the level instrument. The elongated side member is displaced or slid until the indicator attached to the elongated side member becomes visible in the light of sight of the level instrument. A second marking is made on the side of the curb, the second marking and the first marking defining the flowline.

BRIEF DESCRIPTION OF THE DRAWINGS

By way of example, reference will now be made to the accompanying drawings.

DETAILED DESCRIPTION

A method and apparatus to set a flowline grade are disclosed. The apparatus comprises a leveling rod that permits a single person to make the marking. The instrument person still stays at the level instrument and establishes the desired rate of flow. However, unlike prior methods, only person is needed to hold the rod and mark the curb. The single rod man is able to accomplish this by resting the shaft of the rod on the curb, and sliding down an elongated member that extends outwardly from the leveling rod. The elongated member includes a gutter marker on its distal end, which the rod man utilizes to paint the curb. With the slidably attached elongated member as part of the rod, the curb-marking process can be done by one man, and no longer requires two men.

Figure 1A:
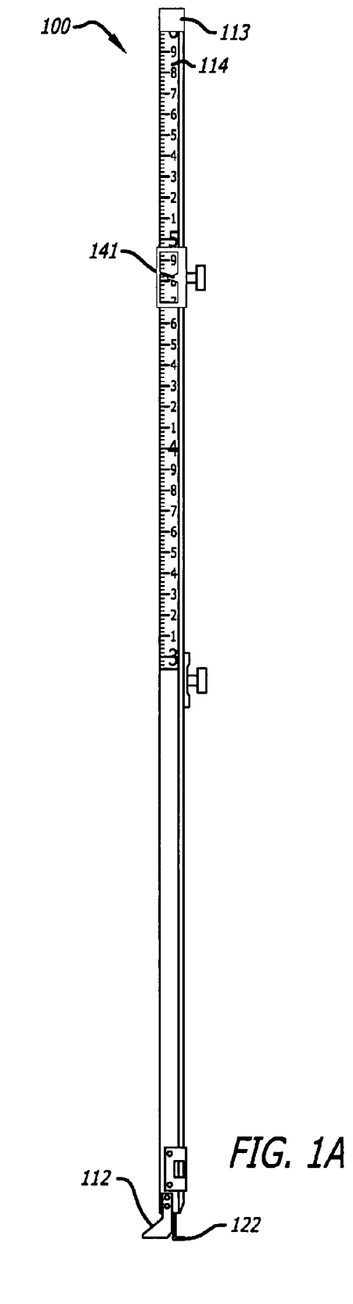
FIG. 1A illustrates a first side view of the leveling rod.

FIG. 1A illustrates a first side view of the leveling rod 100. The leveling rod can be graduated in feet and hundreds of a foot or any type of graduation useful for measurement. In one embodiment, the leveling rod 100 includes a graduation tape 114 indicating feet and fractions of a foot. In one embodiment, the graduation tape 114 only shows graduations for three to six feet. Each foot is marked with a large red numeral, and between each pair of adjacent red numerals, the intermediate tenths of a foot are marked with smaller black numerals. Each intermediate hundredth of a foot between each pair of adjacent tenths is indicated by the top or bottom of one of the shorter black graduations. A pointer 141 slides up and down to indicate a measurement in the graduation tape 114. The pointer 141 is placed by the rod man on signals given by the instrument man.

The leveling rod 100 can further comprise a stencil 122. In one embodiment the stencil 122 is used as a gutter marker to paint a mark on a curb side such that when a street is paved, the gutter is aligned with the mark on the curb. The stencil 122 can include a template shape that allows the mark to have a distinctive shape.

In another embodiment, a resting foot 112 is attached to the bottom end of the leveling rod 100 such that the leveling rod 100 can stand in vertical position on a surface and therefore further assists the rod man to hold the rod in a vertical position. The resting foot 112 comprises a metallic plane perpendicular to the axis of the leveling rod 100. The metallic plane has a surface area large enough to provide balance to the leveling rod 100. In another embodiment, the shaft 110 of the leveling rod 100 can have a cap 113 to prevent upwards movement of the elongated side member 120.

Figure 1B:
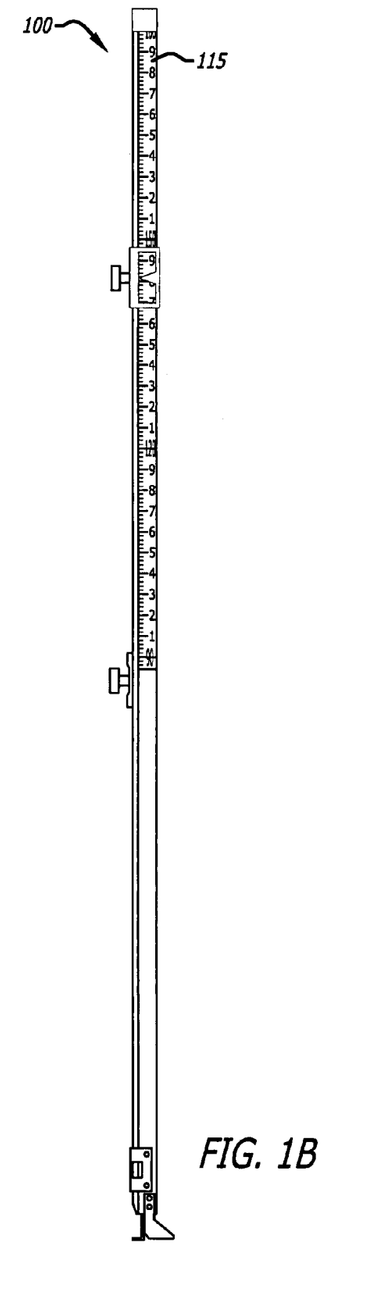
FIG. 1B illustrates a second side view of the leveling rod.

FIG. 1B illustrates a second side view of the leveling rod. In one embodiment, the leveling rod 100 is graduated based on the metric system. Thus, a graduation tape 115 can be provided where the numbering is based on the number of centimeters. The graduation tape 115 can be affixed on the side opposite of where the graduation tape 114 is affixed. In another embodiment, both graduation tapes 114 and 115 can utilize the British system based on feet and inches units. In yet another embodiment, the measurement units on the rod 100 can be those of any other measuring system.

In one approach, the leveling rod 100 has both graduation tapes 114 and 115 graduate with the same units. This permits the instrument man to be able to stand either in front or behind the leveling rod 100 and still be able to view the correct marking of the leveling rod 100 on either side.

Figure 2:
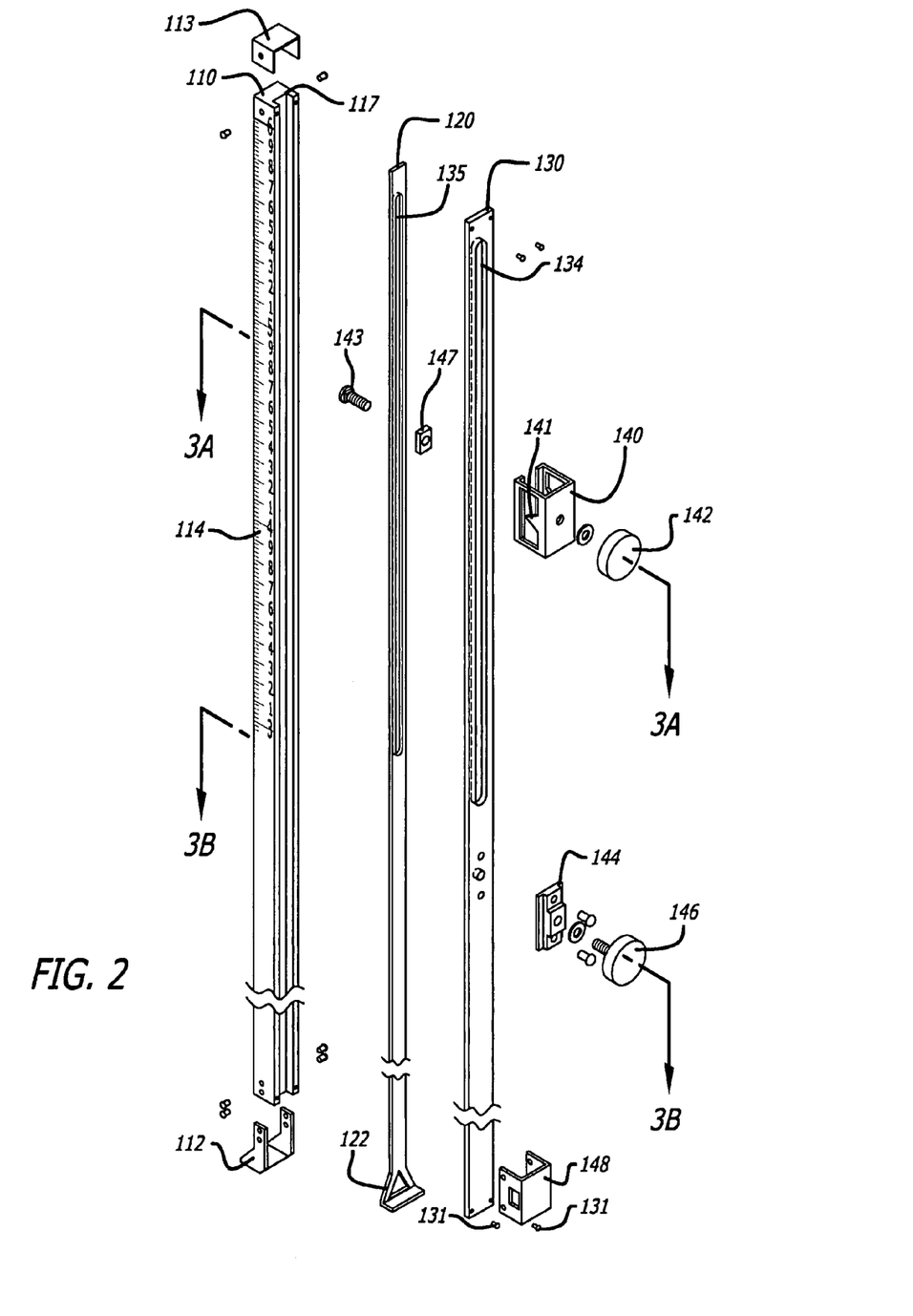
FIG. 2 illustrates an exploded component view of an embodiment of the leveling rod.

FIG. 2 illustrates an exploded component view of an embodiment of the leveling rod. The leveling rod 100 can include a shaft 110 that in one embodiment can be wooden. In further embodiments, the shaft 110 may be plastic, metal, or any other appropriate material. On each side of the shaft 110, the graduation tapes 114 and 115 permit the leveling rod 100 to be read directly by the instrument man sighting through the telescope of a level instrument.

In one embodiment, the shaft 110 includes an longitudinal indentation 117 on a side of the shaft 110 adjacent to the side upon which the graduation tape 114 is affixed. The indentation 117 can serve as a mating channel upon which an elongated side member 120 can be slidably mated so as to slide up and down with a movement parallel to the shaft 110. The elongated side member 120 is connected to the stencil 122 and serves to move the stencil 122 away or to bring it close to the shaft 110.

A cover 130 can be placed on the indented side of the shaft 110 on top of the elongated side member 120. The cover 130 can function to enclose the elongated side member 120 in a housing. The cover 130 is secured by screws 131 and by a sealing bracket 148 against the shaft 110. Thus, once the cover 130 is attached, it does not move in relation of the shaft. The cover 130 also includes a longitudinal opening 134 which permits a knob 142 to fasten against a bolt 143 to secure an indicator 140 to the elongated side member 120. It is further contemplated that other components or structures such as a pushpin mechanism can be used to secure the indicator. The indicator 140 can be a bracket having two arms. The arms can have a hollow portion and a pointer 141 on each hollow portion of the arms. The hollow portion allows for visibility of the numbers on the graduation tapes 114 and 115. The arms of the indicator 140 extend around the shaft 110 so as to give the indicator slidability along the shaft 110 and yet prevent the indicator 140 from detaching from the shaft 110. In another embodiment, the elongated side member 120 can have a corresponding threaded groove where the knob 142 can be secured.

As the knob 142 is secured against the bolt 143 the shaft of the bolt 143 runs through the longitudinal opening 135 of the member 120 and the longitudinal opening 134 of the cover 130. The bolt 143 also screws through a spacer 147 that permits the bolt 143 and the knob 142 to fasten against each other. The spacer is narrow enough to fit in the opening 134 of the cover 130 so that movement. When the knob 142 and the bolt 143 are fastened, a compression force is created that maintains the indicator 140, the spacer 147 and the elongated side member 120 tightly compressed together. The spacer 147 prevents the compression force to be transmitted to the cover plate 130 thus preventing the elongated side member 120 to be fixed to the cover plate 130. Thus, as the elongated side member 120 slides up and down, the indicator 140, the knob 142, the bolt 143 and the spacer 147 also move up and down. The indicator 140 can also be a C-clamp that revolves around the shaft 110 of the leveling rod 100.

As the indicator 140 moves up and down, the pointer 141 can specify the correct measurement of displacement of the elongated side member 120. Thus, as the elongated side member 120 moves down, the knob 142 and the bolt 143 will permit movement of the elongated side member 120 along the longitudinal opening 134, and the limit of the movement of the elongated side member 120 will be the length of the longitudinal opening 134. The indicator 140 can be fixed to the elongated side member 120 at any point but within the limits of the longitudinal opening 143.

As mentioned above, elongated side member 120 comprises stencil 122. The downward displacement of stencil 122 depends on the movement of the elongated side member 120 and also where the indicator 140 is placed. For example, if the elongated side member 120 is slid completely into the shaft 110 and the indicator 140 is placed such that the pointer is pointing to the numeral six in the graduation tape 114, the indicator 140 has full downward range of motion. When calibrating the indicator 140 to a fixed position, the longitudinal opening 135 provides the range of motion for the indicator 140, because the bolt 143 and knob 142 moves along the longitudinal opening 135.

However, once the indicator 140 is fixed to the elongated side member 120, the range of motion of the indicator 140 with relation to the shaft 110 can be limited by the length of the opening 134. Therefore, if the longitudinal opening 134 extends for three feet below the six-foot mark, the stencil 122 can reach as far as three feet below the resting plane of the shaft 110. On the other hand, if the indicator 140 is fixed to the elongated side member 120 where the pointer 141 is pointing to the numeral three, then the elongated side member 120 and the indicator 140 will have no downward range of displacement available.

In another embodiment, the elongated side member 120 can be secured to the cover 130 by a thumbscrew 146 and a bracket 144. The bracket 144 works as a boss to allow thumbscrew 146 to have more threading volume. The thumbscrew 146 traverses the cover 130 and when screwed on, exerts pressure on the elongated side member 120. Because the cover 130 is static in relation to the shaft 110, when screwed on, thumbscrew 146 works to prevent the movement of the elongate side member 120. When thumbscrew 146 is loosened, it permits the elongated side member 120 to slide.

Figure 3A:
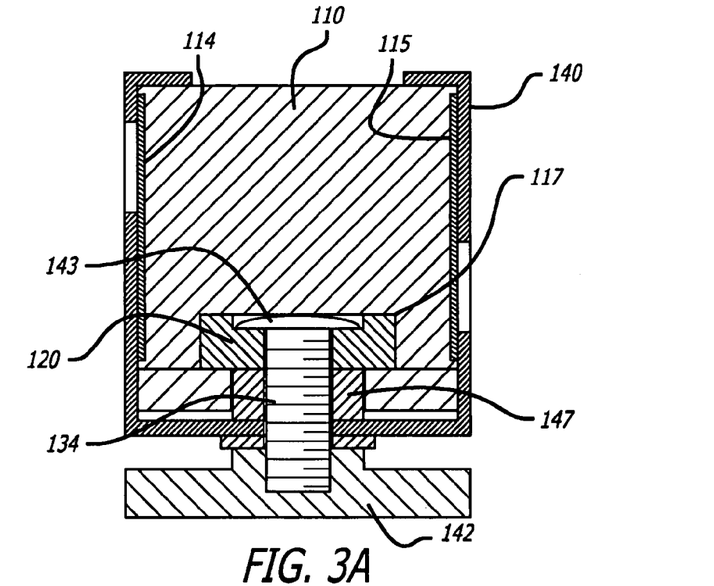
FIG. 3A illustrates a cross section view of the leveling rod across line A-A of FIG. 2.

FIG. 3A illustrates a cross section view of the leveling rod across line A-A of FIG. 2. The cross section view shows the shaft 110 with the indentation 117. The cross section of the elongated side member 117 is shown fitting in the indentation 117. The cover 120 is screwed onto the shaft 110 and shown with a hollow middle portion representing the longitudinal opening 134 in the cover 130. The knob 142 is screwed on and presses against the elongated side member 120 thus securing the indicator 140 to the elongated side member 120.

Figure 3B:
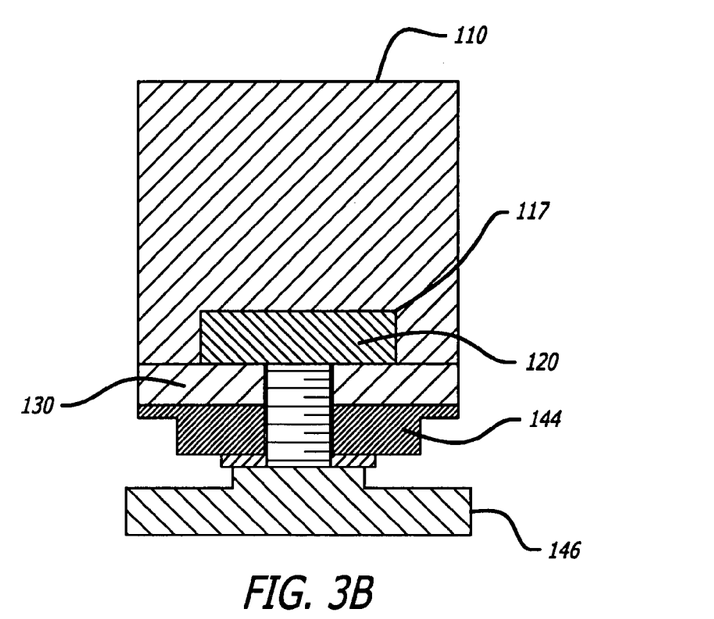
FIG. 3B illustrates a cross section view of the leveling rod across line B-B of FIG. 2.

FIG. 3B illustrates a cross section view of the leveling rod across line B-B of FIG. 2. The cross section view shows the shaft 110 with the indentation 117, as well as the cover 120 screwed onto the shaft 110. Thumbscrew 146 however, pierces through bracket 144 and through the cover 130 to exert pressure on the elongated side member 120. Unlike knob 142 which can move vertically along the longitudinal opening 134, thumbscrew 146 traverses a screw hole in the cover 130, thus preventing any vertical motion of thumbscrew 146. Thus, thumbscrew 146 functions as a locking or clamping mechanism that permits the rod man to keep the elongated side member 120 locked and fixed to the shaft 110.

Figure 4:
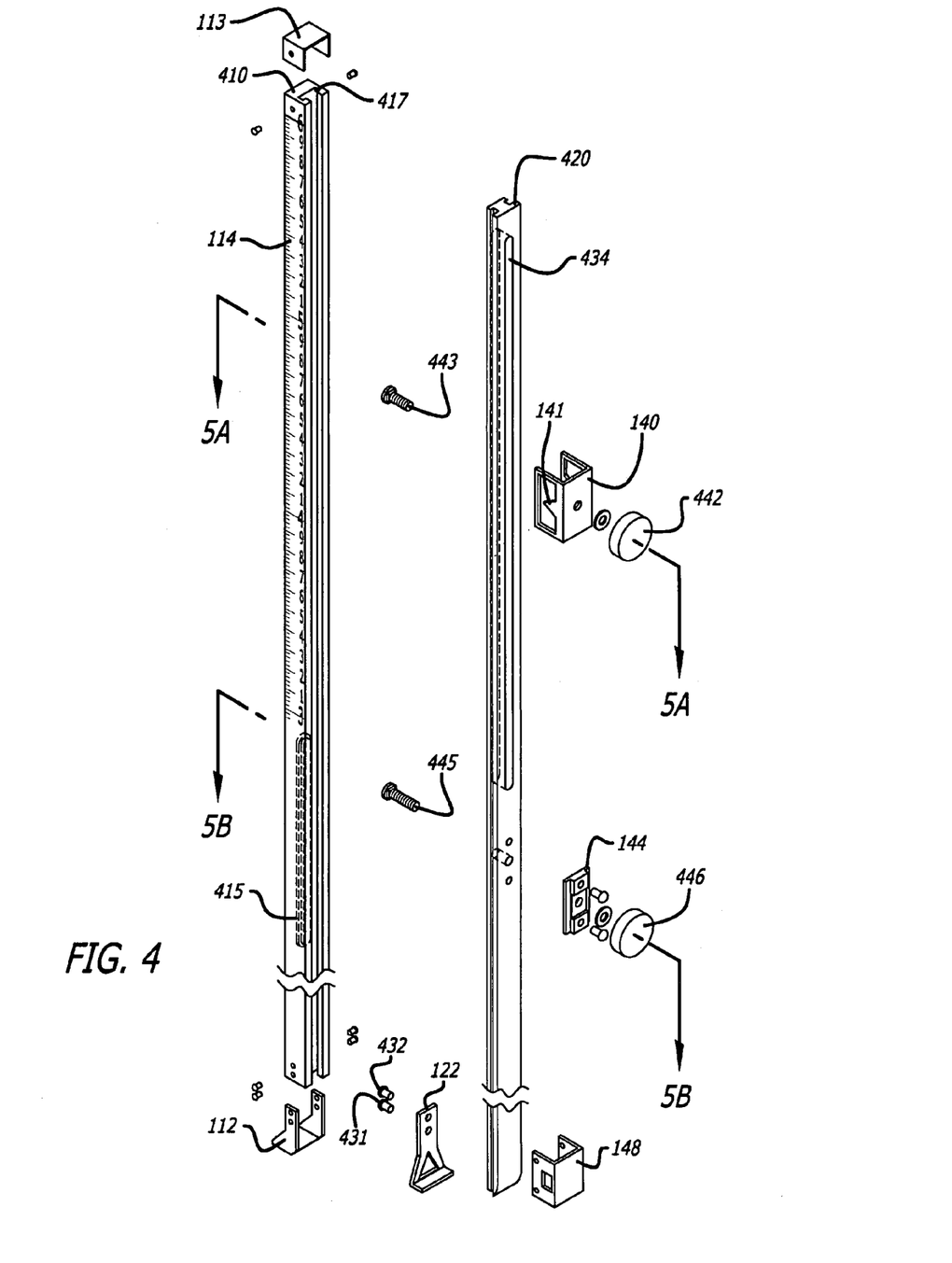
FIG. 4 illustrates an exploded component view of an embodiment of the leveling rod.

FIG. 4 illustrates an exploded component view of an embodiment of the leveling rod. In an alternative embodiment, the leveling rod 100 can include a wooden shaft 410. On each side of the shaft 410 graduation tapes 114 and 115 are affixed to facilitate direct readings from a level instrument or target readings by a rod man.

The shaft 410 can include a longitudinal groove 417 having an undercut configuration. The groove 417 runs throughout the length of the shaft 410 and on one of the sides of the shaft 410. The longitudinal groove 417 serves as a mating channel upon which an elongated side member 420 can be slidably mated so as to slide up and down with a movement parallel to the shaft 410. The elongated side member 420 has a H-shaped transversal cross section which permits it to slide into the longitudinal groove 417 of the shaft 410 so that movement can only be parallel to the axis of the shaft 410. The elongated side member 420 mates with the longitudinal groove 417 by sliding one side of the elongated side member 420 into the groove 417, while permitting the second side to stay free and atop a side of the shaft 410.

The elongated side member 420 is connected to the stencil 122 and can serve to move the stencil 122 away or to bring it close to the shaft 410. In one embodiment, the stencil 122 is connected to the elongated side member 420 by threaded fasteners 431 and 432. In one approach, the threaded fasteners 431 can be conventional screws.

The elongated side member 420 includes a longitudinal opening 434 which permits a threaded fastener such as bolt 443 to secure the indicator 140 to the elongated side member 420. The longitudinal opening 434 varies in length depending on variables such as the average height and eye level of the instrument man, the height of the curb, etc. In one embodiment, the longitudinal opening 434 can be approximately two feet and six inches.

To fasten bolt 443 a knob 442, the bolt 443 runs through the longitudinal opening 434 of the elongated side member 420. As the indicator 140 is secured against the elongated side member 420, the indicator 140 becomes attached to the elongated side member 420. Thus, movement of the elongated side member 420 along the shaft 410 produces equal movement of the indicator 140. As mentioned before, as the indicator 140 moves up and down, the attached pointer 141 points to different graduations in the graduated tapes 114 and 115. In one approach, the graduations pointed to by the pointer 141 are representative of the displacement of the elongated side member 420 in relation to the shaft 410.

In one embodiment, in relation to the elongated side member 420, the indicator 140 can be readjusted in position within the range of the longitudinal opening 434. The indicator 140 can be readjusted to the instrument height of a level instrument. Therefore, whenever the instrument height changes, the indicator is readjusted so as to reflect the new instrument height. The indicator 140 can be readjusted to a position along the elongated side member 420. In that position, the indicator 140 would point to a specific measurement when the elongated side member 420 is not displaced in relation to the shaft 410. For example, the elongated side member 420 can be slidably connected to the shaft 410 and not be displaced in relation to each other. The indicator 140 can be fastened and secured against the elongated side member when the pointer 141 points exactly to the 5 foot marking on the graduation tape 114. Next, if the elongated side member 420 is moved downwards, the attached stencil 122 will displace a longitude equals to the difference between the marking of the pointer 141 (e.g. 4 ft) and the original position at 5 ft. If the marking of the pointer 141 were 4 ft. then the longitudinal difference, and hence the distance of the displacement, would be one foot.

In another embodiment, the elongated side member 420 can be secured to the shaft 410 by a bolt 445 and a knob 446. The head of the bolt 445 slides into a second groove 415 inside the shaft 410. In one approach, the second groove 415 is shorter than groove 417, and only runs through a fraction of the length of the shaft 410. In addition, the bolt 445 is coupled with the knob 446 and traverses a hole in the elongated side member 420 as well as the securing bracket 144. When screwed on, the bolt 445 and the knob 446 produce a compression force between part of the shaft 410 and the elongated side member 420. The compression force permits the locking of the elongated side member 420 to the shaft. Loosening bolt 445 and knob 446 permits the elongated side member 120 to slide.

The length of the second groove 415 can determine the range of motion of the elongated side member 420, because the head of the bolt 445 runs along the second grove 415. Thus, when bolt 445 and the knob 446 are fastened but not locked, the elongated side member 420 can slide. The limit and length of the second groove 415 can be determined based upon the displacement requirements of construction. If the leveling rod 100 is to be used for marking the flowline on the curbside, the second groove 415 can have a fourteen-inch length.

Figure 5A:
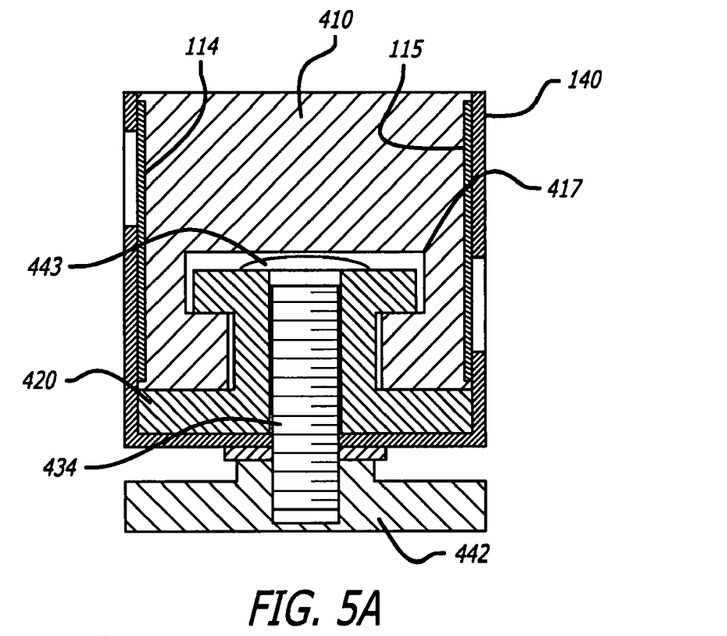
FIG. 5A illustrates a cross section view of the leveling rod across line A-A of FIG. 4.

FIG. 5A illustrates a cross section view of the leveling rod across line A-A of FIG. 4. The cross section view shows the shaft 410 with the groove 417 receiving the elongated side member 420 and the bolt 443 headfirst. The bolt 443 traverses through the longitudinal opening 434 of the elongated side member 420. The bracket-shaped indicator 140 is placed around the shaft and the elongated side member. However, the indicator 140 can be fixed to the elongated side member 420 only, and not to the shaft 410. This can be done by fastening the knob 442 with the bolt 443.

Figure 5B:
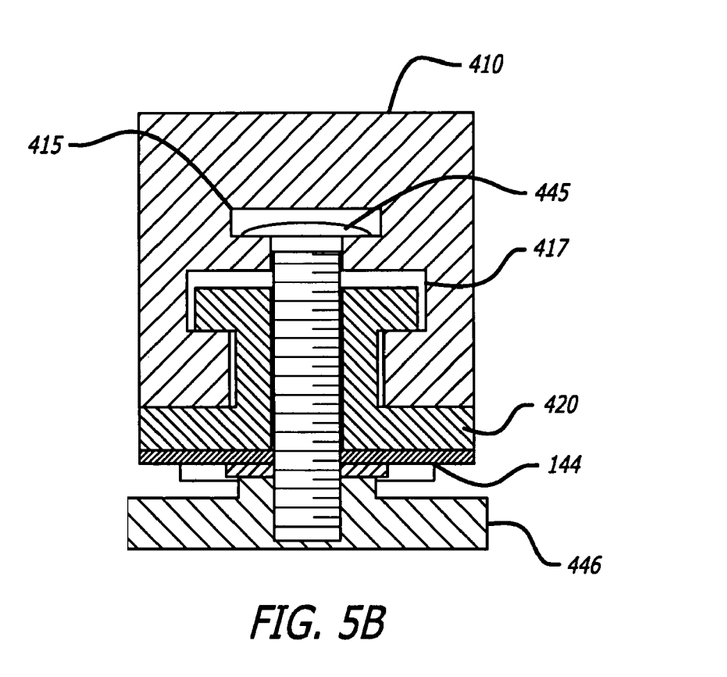
FIG. 5B illustrates a cross section view of the leveling rod across line B-B of FIG. 4.

FIG. 5B illustrates a cross section view of the leveling rod across line B-B of FIG. 4. The cross section view shows the shaft 410 with the groove 417, and the second groove 415. The grove 417 receives one side portion of the elongated side member 420 and permits the elongated side member 420 to slide along the axis of the shaft 410. The second groove 415 permits bolt 445 to slide up and down. However, and bolt 445 fastens with knob 446 the compression force fixes bracket 144 and the elongated side member 420 to the shaft 410. Accordingly, bolt 445 and knob 446 function as a locking or clamping mechanism that permits the rod man to keep the elongated side member 420 locked and fixed to the shaft 410.

Figure 6A:
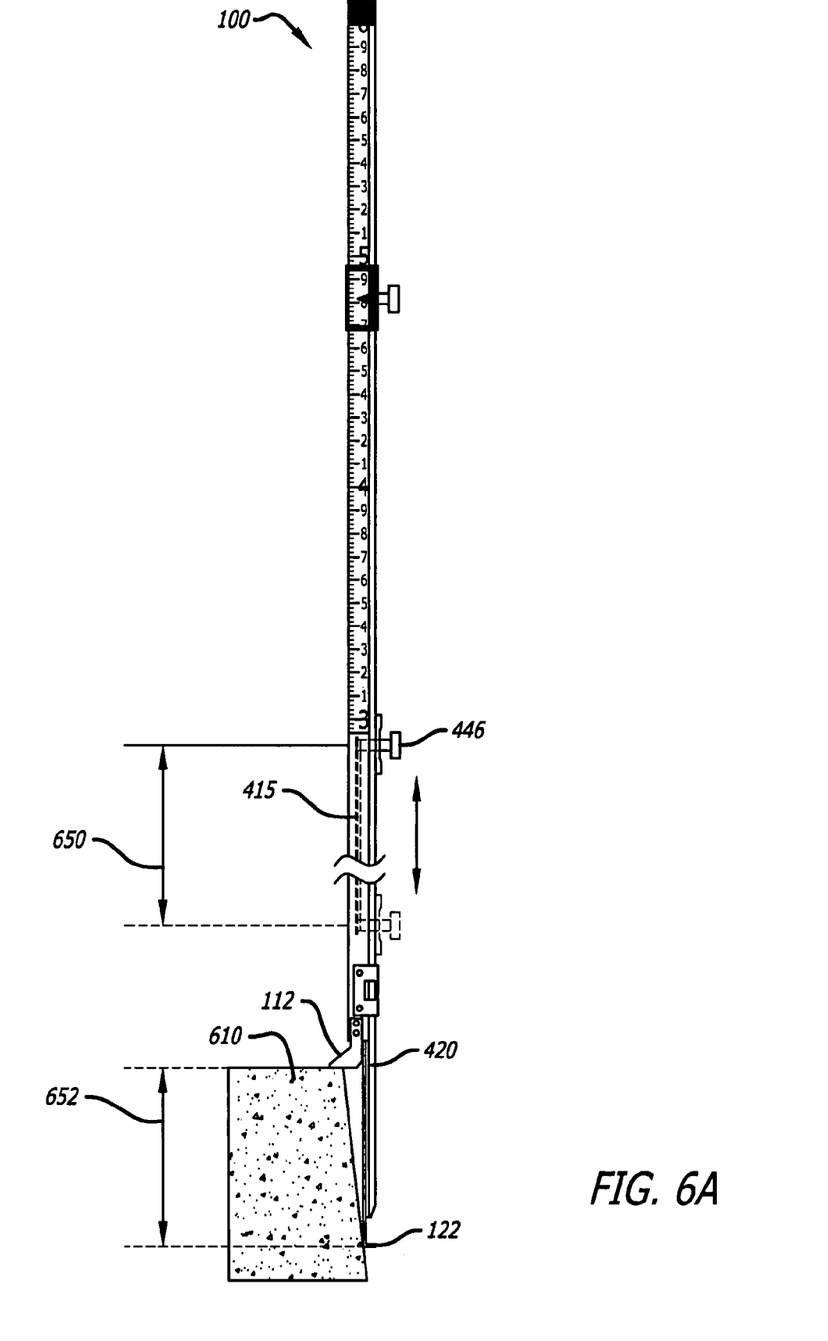
FIG. 6A illustrates the side view of the leveling rod as in FIG. 1A, wherein the leveling rod is positioned on a curb.

FIG. 6A illustrates the side view of the leveling rod as in FIG. 1A, wherein the leveling rod is positioned on a curb 610. The leveling rod 100 is positioned on the curb such that the graduation tape 114 faces a level instrument also positioned on the curb 610. The resting foot 112 is placed on the border of the curb 610. The rod man can then loosen knob 446 so as to permit sliding movement of the elongated side member 120 and the attached stencil 122. As the stencil 122 moves down the face of the curb 610, the rod man can mark a delta on the curbside using the stencil 122.

In one embodiment, the movement of the elongated side member 120 is limited to the length of the second groove 415. This is because the bolt 445 and the knob 446 are disposed within the second groove 415. Therefore, the movement of the bolt 445 is also being limited to the grove 415. Therefore, as the elongated side member 120 slides, the downward displacement 652 of the stencil 122, is equal to the downward displacement 650 of the bolt 445 and knob 446.

Figure 6B:
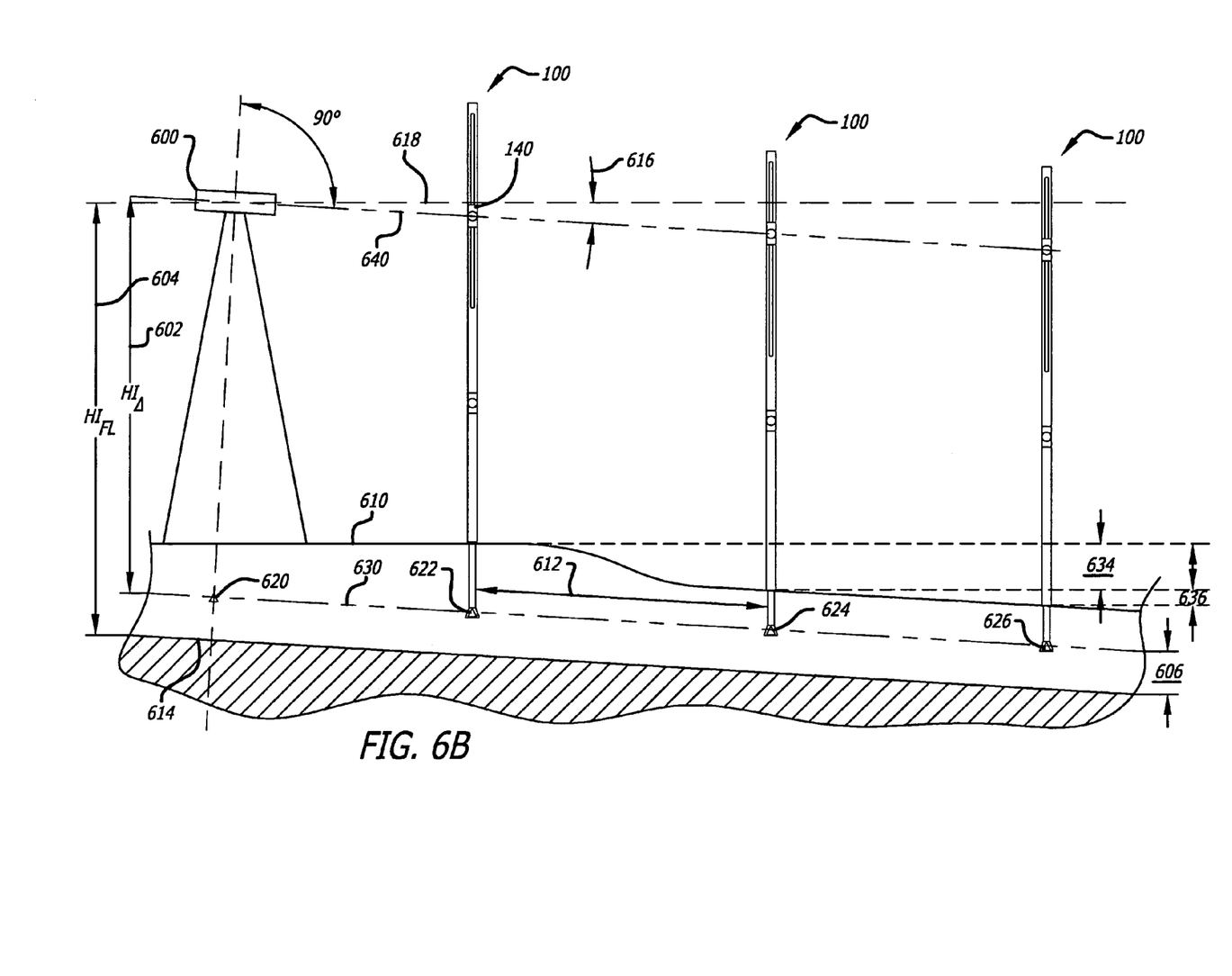
FIG. 6B illustrates an environmental view of the leveling rod and a level instrument with the leveling rod surveying a flowline grade.

FIG. 6B illustrates an environmental view of the leveling rod 100 and a level instrument 600 with the leveling rod surveying a flowline grade. The level instrument 600 is mounted on a tripod resting on the surface of the curb 610. The level instrument 600 is graduated to be perpendicular to the flowline 614. Thus, the line of sight of the level instrument 600 is configured to run parallel to the flowline 614. The instrument man can calibrate the telescope graduation to be aligned to the flowline 614 by utilizing predetermined measurements provided as part of the specifications for the flowline 614. In one embodiment, the flowline 614 has a slope of 0.02 percent, which is equivalent to an angle 616 of 0° 7' (zero degrees and seven minutes).

Once the flowline is determined, a first marking can be made on the side of the curb. In one approach, the marking can have a triangular shape, resembling a delta. The first delta 620 can be marked above a predetermined distance 606 from the flowline 614. For example, the first delta 620 can be three inches above the flowline 614. In marking the deltas for a flowline, the deltas are marked three inches above the flowline 614 so that paving grades can be inspected. Further, the three-inch clearance prevents the deltas to be erased or covered up by cement or tar.

To mark the next delta on the face of the curb, and after instrument man positions the level instrument 600 above the first delta 620, the rod man positions the rod 100 a predetermined distance away from the level instrument 600 and along the curb 610. The distance between the level instrument and the may increase by a constant distance 612 (e.g. 12.5 ft) for every delta marked. Therefore, the deltas marked evenly separated along the curb 610.

The height of the instrument (HI) is measured with respect to the first delta 620 and with respect to the flowline 614. Thus, the HI 602 corresponds to the distance between the level instrument 600 and the base of the first delta 620. The rod man first slides the elongated side member 420 so that the resting foot 112 and the stencil 122 are aligned on the same plane. Next, the leveling rod 100 is calibrated such that the pointer 141 points to the measurement equivalent to the magnitude of the HI 602. This calibration permits to have a uniform and fixed measurement at part point throughout the curb 610. As explained earlier, to calibrate to leveling rod 100 to the magnitude of HI 602, the indicator 140 is slid longitudinally until the pointer 141 points to the correct grading in the graduation tape 114. Then, the indicator 140 is secured and tightened with the elongated side member.

With the leveling rod 100 calibrated to the HI 602, the rod man places the rod 100 on top of the curb, so as to permit the rod 100 to rest on the resting foot 112. The side corresponding to the elongated side member 420 faces the same direction as the face of the curb 610 (i.e. the street). The rod man then moves the elongated side member up and down while listening to the instructions of the instrument man. The instrument man utilizes the telescope in the level instrument 600 to see when the pointer 141 in the leveling instrument 100 coincides with the line of sight 640. As soon as it coincides, the instrument man communicates to the rod man that the pointer 141 is in the correct position. The rod man stops sliding the elongated side member and secures the elongated side member against the rod 100, using the thumbscrew 146 as shown in FIG. 2 or the knob 446 as shown in FIG. 4. The rod man then can then spray paint or otherwise mark at the position in the face of the curb 610 at which the stencil 122 positioned. The marking using stencil 122 will produce a second delta 622. As previously mentioned, the line of sight 640 of the level instrument 600 is parallel to the flowline 614. Thus, the distance between the delta 622 marked by the rod man and the line of sight is a constant, namely the HI 602.

When the leveling rod 100 is placed on an uneven portion of the curb 610, the rod man, at the instructions of the instrument man, can adjust the pointer 141 so as to align the pointer 141 to the line of sight 640. Again, this is accomplished by sliding the elongated side member up and down. Once the pointer 141 is again aligned with the light of sight 640, the rod man can mark a third delta 624 on the face of the curb 610.

Because the indicator 140 is fixed to the elongated side member, the distance between the pointer 141 in the indicator 140 and the stencil 122 is constant and equivalent to the HI 602. However, the reading of the graduation tape 114 varies depending on the elevation and angle change of the curb. For example, at the second delta 622, the reading on the graduation tape 114 could be 4.60 feet. The HI 602 remains constant. At the third delta 624, the reading on the graduation tape 114 could be 4.9 feet, indicating a distance difference 634 of 0.3 feet between the elevation of the curb at the second delta 622 and the elevation of the curb at the third delta 624. Similarly, at the fourth delta 626, the reading on the graduation tape 114 could change to 5.0 feet, indicating a distance difference 636 of 0.1 feet between the elevation of the curb at the third delta 622 and the elevation of the curb at the fourth delta 624.

While the readings on the leveling rod 100 change with respect to the changes in the elevation of the curb, the deltas are marked along a gutter line 630 which is parallel to the flowline 630 and to the line of sight 616. Having the deltas aligned on the gutter line 630 facilitates road construction when paving the level of the roads.

Although certain illustrative embodiments and methods have been disclosed herein, it will be apparent form the foregoing disclosure to those skilled in the art that variations and modifications of such embodiments and methods may be made without departing from the true spirit and scope of the art disclosed. Many other examples of the art disclosed exist, each differing from others in matters of detail only. For instance, various types of leveling rods can be used such as the Philadelphia rod, the San Francisco rod, the Chicago rod, the Lenker rod, etc. Furthermore, the elongated side member can be coupled with the shaft of the leveling rid utilizing other mechanisms. Also different shapes of the stencil can be provided such as a square, a rectangle, a circle, or an irregular shape corresponding to a particular object. Finally, it will also be apparent to one skilled in the art that the leveling rod can be used in surveying for construction of any other structure or system that requires consecutive markings to form a line with a pre-specified slope.

Accordingly, it is intended that the art disclosed shall be limited only to the extent required by the appended claims and the rules and principles of applicable law.

I claim:

1. A leveling rod, comprising:
   an elongated shaft;
   at least one tape with measurement graduations affixed longitudinally to the elongated shaft;
   an elongated side member, the elongated side member slidably coupled with the elongated shaft, the elongated side member being extendable downwards;
   a stencil attached to the bottom end of the elongated side member, wherein the stencil is used to mark a surface;
   an indicator attachable to the elongated side member, wherein the indicator includes a pointer that points to the measurement graduations on the ast least one tape, wherein the indicator can slide longitudinally along the elongated side member until a predetermined position of the indicator is reached;
   a first threaded fastener to fix the indicator to the elongated side member, wherein the first threaded fastener can slide together with the indicator bfore the indicator is fastened to the elongated side member; and
   a second threaded fastener that allows to fix the elongated side member to the elongated shaft thus preventing the elongated side member from sliding off the elongated shaft.

2. The leveling rod of claim 1, wherein the stencil has a triangular shape and is used to make a marking on the vertical face of a curb.

3. The leveling rod of claim 1, wherein the leveling rod is utilized with a level instrument, wherein the pointer in the indicator is fixed to point to a measurement equal to the height of the level instrument measured from the flowline on a street.

4. The leveling rod of claim 1, wherein the predetermined position of the indicator is the height of a level instrument.

5. The leveling rod of claim 1, wherein when the indicator is attached to the elongated side member the indicator slides in conjunction with the elongated side member in relation to the elongated shaft.

6. The leveling rod of claim 1, further comprising a groove longitudinally disposed in the shaft wherein the elongated side member can be slid.

7. The leveling rod of claim 1, further comprising a second groove longitudinally disposed in the shaft wherein the second threaded fastener can move up and down, wherein the second threaded fastener fastens the elongated side member to the elongated shaft thus preventing the elongated side member from sliding off the elongated shaft.

8. The leveling rod of claim 1, further comprising a resting foot attached to the bottom of the leveling rod in order to permit the leveling rod to stand without lateral support.

9. The leveling rod of claim 1, wherein the shaft has a rectangular cross-section or a circular cross-section.

10. The leveling rod of claim 1, wherein the stencil has a rectangular shape or a circular shape.

11. An apparatus to survey a flowline on a street, comprising:
    a main rod having measurement graduations on a longitudinal side;
    an extendable side rod slidably coupled with the rod, wherein the longitudinal axis of the extendable side rod is parallel to the longitudinal rod, wherein the extendable side rod slides passing the bottom end of the main rod;
    a stencil attached to the bottom end of the extendable side rod, wherein the stencil is used to make a distinctive mark a vertical surface of a curb;
    a pointer fixable to the extendable side rod, wherein the pointer points to the measurement graduations of the main rod, wherein the pointer is mounted on a bracket that slides longitudinally along the extendable side rod until a predetermined position of the pointer is reached;
    a first bolt and knob assembly to fix the pointer to the extendable side rod, wherein the first bolt and knob assembly can slide together with pointer is fixed to the extendable side rod; and a second bolt and knob assembly that allows to fix the extendable side rod to the main rod thus preventing the extendable side rod from sliding off the main rod.

12. A method of surveying a flowline utilizing a leveling rod with a stencil, the method comprising:

providing a leveling rod having a graduated shaft and an elongated side member, wherein the elongated side member is slidably coupled with shaft and has a stencil attached to the bottom end of the elongated side member;

placing a level instrument on a curb, the level instrument being calibrated with a height such that the line of sight of the level instrument is parallel to a desire flowline;

making a first marking on the side of a curb, the first marking being a point in the flowline;

attaching an indicator to the elongated side member at an elevation relative to the bottom end of the elongated side member, the height of being equal to the height of the level instrument in relation to the first marking;

placing the leveling rod at a predetermined distance from the level instrument, such that a foot of the graduated shaft rests on the curb;

sliding the elongated side member until the indicator attached to the elongated side member becomes visible in the line of sight of the level instrument; and making a second marking on the side of the curb using the stencil attached to the bottom end of the elongated side member, the second marking and the first marking defining the flowline.

13. The method of claim 12, wherein the stencil has a triangular shape.

14. The method of claim 12, wherein sliding the elongated side member comprises moving the elongated side member along a groove longitudinally disposed in the graduated shaft wherein the elongated side member can be slid.

15. The method of claim 14, further comprising:

fastening the elongated side member to the graduated shaft with a threaded fastener to prevent the elongated side member from sliding off the graduated shaft; and sliding the threaded fastener along a second groove longitudinally disposed in the graduated shaft.

* * * * *